US012558691B2

(12) United States Patent
Bush et al.

(10) Patent No.: US 12,558,691 B2
(45) Date of Patent: Feb. 24, 2026

(54) DEVICE AND METHOD FOR DISPENSING A DROPLET

(71) Applicant: LIGHTCAST DISCOVERY LTD, Cambridge (GB)

(72) Inventors: James Bush, Cambridge (GB); William Michael Deacon, Cambridge (GB); Richard Jeremy Ingham, Cambridge (GB); Thomas Henry Isaac, Cambridge (GB); Gianmarco Mastrogiovanni, Cambridge (GB); Andreas Michael Waeber, Cambridge (GB)

(73) Assignee: LIGHTCAST DISCOVERY LTD, Cambridge (GB)

( * ) Notice: Subject to any disclaimer, the term of this patent is extended or adjusted under 35 U.S.C. 154(b) by 739 days.

(21) Appl. No.: 17/927,142

(22) PCT Filed: May 27, 2021

(86) PCT No.: PCT/GB2021/051290
§ 371 (c)(1),
(2) Date: Nov. 22, 2022

(87) PCT Pub. No.: WO2021/240159
PCT Pub. Date: Dec. 2, 2021

(65) Prior Publication Data

US 2023/0182138 A1 Jun. 15, 2023

(30) Foreign Application Priority Data

May 28, 2020 (GB) ..................................... 2008014

(51) Int. Cl.
*B01L 3/00* (2006.01)

(52) U.S. Cl.
CPC . *B01L 3/502792* (2013.01); *B01L 2200/0647* (2013.01); *B01L 2300/0663* (2013.01); *B01L 2400/0427* (2013.01); *B01L 2400/06* (2013.01)

(58) Field of Classification Search
CPC ....... B01L 3/502792; B01L 2200/0647; B01L 2300/0663; B01L 2400/0427;
(Continued)

(56) References Cited

U.S. PATENT DOCUMENTS 9,017,623 B2 * 4/2015 Fraden .............. B01L 3/502784 422/502
2006/0211132 A1 * 9/2006 Miledi .................. B01L 3/0265 436/180

(Continued)

FOREIGN PATENT DOCUMENTS

| | | |
|---|---|---|
| EP | 3 656 472 | 5/2020 |
| WO | 2006/026351 | 3/2006 |
| WO | 2006/129486 | 12/2006 |
| WO | 2016/0902095 | 6/2016 |
| WO | 2016/172623 | 10/2016 |
| WO | 2019/148013 | 8/2019 |

OTHER PUBLICATIONS

International Search Report issued Jul. 21, 2021, in International (PCT) Application No. PCT/GB2021/051290, 4 pages.

(Continued)

*Primary Examiner* — Brian J. Sines
(74) *Attorney, Agent, or Firm* — Porter Wright Morris & Arthur LLP

(57) ABSTRACT

A device for dispensing one or more microdroplets is provided. The device comprising a microfluidic chip having an oEWOD structure configured to create an optically-mediated electrowetting (oEWOD) force, the microfluidic chip includes a first region and a second region, wherein said first and second regions are separated by a constriction; wherein the first region is adapted to receive and manipulate one or more microdroplets dispersed in a carrier fluid at first (Continued)

flow rate; and wherein the second region is configured to receive the microdroplet via the constriction from the first region and transfer said microdroplet to an outlet port of the microfluidic chip in a second flow rate; wherein the second region is configured to receive said microdroplet via the constriction from the first region by application of an optically -mediated electrowetting (oEWOD) force; and wherein the second flow rate in the second region is higher than the first flow rate in the first flow region. A method and apparatus for dispensing one or more microdroplets are also provided.

20 Claims, 6 Drawing Sheets

(58) Field of Classification Search
CPC ......... B01L 2400/06; B01L 2200/0642; B01L 2200/0652; B01L 2200/0673; B01L 2400/0638; B01L 2400/0688; B01L 2400/088; B01L 3/502715; B01L 3/502738; B01L 3/502761; B01L 3/502776; B01L 3/50273; B01L 3/5082; B01L 3/5085
See application file for complete search history.

(56) References Cited

U.S. PATENT DOCUMENTS

2011/0180571 A1 7/2011 Srinivasan et al.
2012/0024708 A1 2/2012 Chiou et al.
2013/0270287 A1* 10/2013 Guo ...................... G01N 15/02 221/10
2015/0253284 A1 9/2015 Sudarsan et al.
2016/0158748 A1* 6/2016 Wu ..................... B01L 3/50273 422/504
2017/0128941 A1* 5/2017 Sadri .................. G01N 15/1023
2023/0111707 A1* 4/2023 Bush ................. B01L 3/502792 422/503
2023/0256448 A1* 8/2023 Sosna ............... B01L 3/502792 435/383

OTHER PUBLICATIONS

Written Opinion of the International Searching Authority issued Jul. 21, 2021, in International (PCT) Application No. PCT/GB2021/051290, 8 pages.
Patents Act 1977: Search Report under Section 17 issued Nov. 30, 2020, in corresponding GB Application No. 2008014.9, 2 pages.

* cited by examiner

DEVICE AND METHOD FOR DISPENSING A DROPLET

The present invention relates to a device and a method for dispensing microdroplets and in particular, to a device comprising a microfluidic chip for dispensing one or more microdroplets. The present invention also relates to a method of dispensing one or more microdroplets.

Devices for manipulating droplets or magnetic beads are well known in the art. One technique for the manipulation of droplets involves causing the droplets, for example in the presence of an immiscible carrier fluid, to travel through a microfluidic space defined by two opposed walls of a cartridge or microfluidic tubing. Embedded within one or both walls are microelectrodes covered with a dielectric layer each of which is connected to an NC biasing circuit capable of being switched on and off rapidly at intervals to modify the electric field characteristics of the layer. This gives rise to localised directional capillary forces in the vicinity of the microelectrodes which can be used to steer the droplet along one or more predetermined pathways. Such devices, which employ what hereinafter and in connection with the present invention will be referred to as 'real' electrowetting electrodes, are known in the art by the acronym EWOD (Electrowetting on Dielectric) devices. A variant of this approach, in which the electrowetting forces are optically-mediated, is known in the art as optoelectrowetting and hereinafter the corresponding acronym oEWOD.

Microfluidic devices employing oEWOD may include a microfluidic cavity defined by first and second walls whereby the first wall is of composite design and comprised of substrate, photoconductive and insulating (dielectric) layers. Between the photoconductive and insulating layers, there may be disposed of an array of conductive cells which are electrically isolated from one another and coupled to the photoactive layer and whose functions are to generate corresponding electrowetting electrode locations on the insulating layer. At these locations, the surface tension properties of the droplets can be modified by means of an electrowetting field. These conductive cells may then be temporarily switched on by light impinging on the photoconductive layer. This approach has the advantage that switching is made much easier and quicker although its utility is to some extent still limited by the arrangement of the electrodes. Furthermore, there is a limitation as to the speed at which droplets can be moved and the extent to which the actual droplet pathway can be varied.

During and/or after droplet manipulation using EWOD or oEWOD in microfluidic chips as described above, many of the prospective workflows on microfluidic systems require recovery of material such as cells, beads or genetic material out of the microfluidic chip and into conventional liquid handling vessels such as 384-well plates or microtubes. Droplets that are dispensed out of the microfluidic chip can be further assayed. These assays in general include PCR amplifications, DNA sequencing, RNA sequencing and cell expansion. In particular, recovery of droplets for genetic assays is often required since such assays commonly involve extreme temperature cycles which, if conducted in the microfluidic chip, would kill any cells retained on the chip.

Recovery of sub-nanolitre droplets from microfluidic systems is a longstanding engineering challenge in microfluidics. Generally it is challenging or impossible to recover droplets one-by-one through conventional mechanical operations, as the volume displacement required places mechanical constraints on the actuators used to displace fluids. Well known existing systems used for continuous flow fluidics include drop-on-demand micro-actuators and precision engineered dispense nozzles; fundamentally each one requires a nanolitre fluid displacement step.

An alternative approach to single-droplet recovery is the use of barcoding chemicals such as DNA barcodes. In this class of scheme, droplets are loaded with unique DNA barcodes before being introduced to a droplet fluidic system and assayed. DNA sequencing often requires costly, complex instrumentation. Droplets exhibiting an interest in the on-chip assay are then recovered in a pooled format and the barcodes read to recover the identity of the input cell. Such schemes avoid the requirement for droplet-by-droplet recovery, however they place constraints on the nature of the on-chip assay and add costly, complex preparation and analysis steps.

Therefore, there is a requirement for providing a droplet-recovery system for users that is readily feasible in combination with a microfluidic chip. In addition, there is also a need to provide a cost-effective and efficient dispensing system and method of transferring microdroplets from the microfluidic chip in order to recover materials from the chip to conduct assays on the cellular content of the droplets. There is also a requirement for a system which has the flexibility to recover sub-nanolitre droplets one-by-one, whilst also being able to dispense droplets in a pooled format where required.

It is against the background that the present invention has arisen.

According to an aspect of the present invention, there is provided a device for dispensing one or more microdroplets comprising a microfluidic chip having an oEWOD structure configured to create an optically-mediated electrowetting (oEWOD) force, the microfluidic chip includes a first region and a second region, wherein said first and second regions are separated by a constriction;

- wherein the first region is adapted to receive and manipulate one or more microdroplets dispersed in a carrier fluid at a first flow rate; and
- wherein the second region is configured to receive the microdroplet via the constriction from the first region and transfer said microdroplet to an outlet port of the microfluidic chip in a second flow rate;
- wherein the second region is configured to receive said microdroplet via the constriction from the first region by application of an optically-mediated electrowetting (oEWOD) force; and
- wherein the second flow rate in the second region is higher than the first flow rate in the first region.

In some embodiments, there may be provided a device for dispensing one or more microdroplets comprising a microfluidic chip, the microfluidic chip includes a first region and a second region, wherein said first and second regions are separated by a constriction means;

- wherein the first region is adapted to receive and manipulate one or more microdroplets dispersed in a carrier fluid at a low carrier fluid flow rate; and
- wherein the second region is configured to receive the microdroplet via the constriction means from the first region and transfer said microdroplet to an outlet port of the microfluidic chip at a higher carrier fluid flow rate,
- characterised in that the second region is configured to receive said microdroplet via the constriction means from the first region by application of an optically-mediated electrowetting (oEWOD) force.

The device and method as disclosed in the present invention are advantageous because it enables the recovery of microdroplets and in some cases, sub-nanolitre droplets from microfluidic systems in a simplified and cost effective system as described in the present invention. The droplet recovery system as described in the present invention enables a user to efficiently remove the droplet from a microfluidic device and recover or dispense the droplet of interest onto a receptacle such as a multi-well plate. This would allow for the user to be able to conduct further assays on the cellular content or bead content of the droplets which are not readily feasible on the microfluidic chip. These assays may include but are not limited to PCR amplifications, DNA sequencing, RNA sequencing and/or cell expansion. In addition, individual droplets from the microfluidic device can be selected for retrieval and then deposited onto a multi-well plate.

Furthermore, the device and method as disclosed can be used to dispense individual droplets followed by pre-screening to select only the microdroplets of interest. This prevents later analysis of irrelevant droplets and allows the selection of only relevant sub sections of on-chip droplets.

In addition, a sub-population of the droplets contained within the microfluidic device can be selected for dispense whilst any remaining droplets are retained inside the chip without necessarily affecting their environmental conditions.

In some embodiments, microdroplets may be dispensed from the device individually. In some embodiments, multiple microdroplets may be dispensed from the device simultaneously. In some embodiments, microdroplets may be grouped or pooled by activity and multiple selected microdroplets may be dispensed from the device as required. In some embodiments, the activity of the microdroplets may be addressed for example by fluorescence intensity.

In some embodiments, the carrier fluid in the first region is at low or zero flow rate. The first region can be used to hold or store the microdroplets. Droplet manipulations in the first region may also include but are not limited to oEWOD operations to sort, merge, split, or arrange droplets for example into an array.

In some examples, the microdroplets can be manipulated in the first region of the chip. In some embodiments, the low rate may be within the range of 0 to 20 μL/min. In some embodiments, the first flow rate may be within the range of 0 to 20 μL/min.

In some embodiments, the carrier fluid in the second region has a high flow rate. By providing a high flow rate in the second region, the droplets are able to move towards the outlet port of the microfluidic device. For example, the high flow rate is within the range of 10 to 100 μL/min. For example, the second flow rate is within the range of 10 to 100 μL/min.

In some embodiments, the flow rate in the second region can be dynamically controlled such that it can vary between a low/nil rate whilst receiving the droplets and at a higher rate whilst the droplet or multiple microdroplets are being ejected. In a further embodiment, the flow rate in the second region may be 0 to 20 μL/min when droplets are not dispensed. In some embodiments, the flow rate in the second region may be 10-100 μL/min during the dispensing procedure.

In some embodiments, in which the second region receives multiple microdroplets from the first region, the flow rate in the second region may 0.02 to 2.00 μL/min, or it may be more than 0.02, 0.05, 0.1, 0.2, 0.3, 0.4, 0.5, 0.6, 0.7, 0.8, 0.9, 1, 1.5 or 2 μL/min. In some embodiments, the flow rate in the second region may be less than 2, 1.5, 1, 0.9, 0.8, 0.7, 0.6, 0.5, 0.4, 0.3, 0.2, 0.1 or 0.05 μL/min. A flow rate above 0 μL/min in the second region can prevent microdroplets from blocking the constriction. Subsequently, once the second region has received multiple microdroplets, the flow rate can be increased to dispense the microdroplets from the microfluidic device efficiently. In some embodiments, the second region may receive 1 to 10 000 microdroplets before the flow rate in the second region is increased. In some examples, the second region may receive more than 1, 50, 100, 200, 500, 700, 1000, 1250, 1500, 1750, 2000, 2500, 3000, 3500, 4500, 5000, 5500, 6000, 6500, 7500, 8000, 8500, 9000, 9500 or 10 000 microdroplets. In some embodiments, the flow rate in the second region can be increased to above 2, 5, 10, 15 or 20 μL/min.

In some embodiments, the cross-sectional area of the first region may be $1\times10^8$ to $1.3\times10^{10}$ μm$^2$. In some embodiments, the area of the first region may be more than $1\times10^8$, $2.5\times10^8$, $5\times10^8$, $7.5\times10^8$, $1\times10^9$, $2.5\times10^9$, $5\times10^9$, $7.5\times10^9$, $1\times10^{10}$ or $1.25\times10^{10}$ μm$^2$. In some embodiments, the area of the first region may be less than $1.3\times10^{10}$, $1\times10^{10}$, $7.5\times10^9$, $5\times10^9$, $2.5\times10^9$, $1\times10^9$, $7.5\times10^8$, $5\times10^8$ or $2.5\times10^8$ μm$^2$.

In some embodiments, the area of the first region may be larger than the area of the second region. It is advantageous for the first region to have a large cross-sectional area to manipulate a large numbers of droplets efficiently, which facilitates a high throughput device. The number of droplets that the first region may accommodate simultaneously is dependent on droplet size, in addition to the area of the first region. For example, a first region with an area of $1.245\times10^{10}$ μm$^2$ may accommodate approximately 220 000 droplets and 110 000 cells with a 100 μm average droplet diameter. A first region with an area of $1.245\times10^{10}$ μm$^2$ may accommodate approximately 432 000 droplets and 216 000 cells with an 80 μm average droplet diameter. A first region with an area of $1.245\times10^{10}$ μm$^2$ may accommodate approximately $1.2\times10^6$ droplets and 600 000 cells with a 50 μm average droplet diameter.

In some embodiments, the microfluidic chip of the present invention has an oEWOD structure configured to create an oEWOD force. The oEWOD structure may be any structure capable of creating an oEWOD force.

In some embodiments, the microfluidic chip of the present invention comprises oEWOD structures comprised of:

a first composite wall comprised of: a first substrate; a first transparent conductor layer on the substrate, the first transparent conductor layer having a thickness in the range 70 to 250 nm; a photoactive layer activated by electromagnetic radiation in the wavelength range 400-1000 nm on the conductor layer, the photoactive layer having a thickness in the range 300-1500 nm and a first dielectric layer on the photoactive layer, the first dielectric layer having a thickness in the range 30 to 160 nm;

a second composite wall comprised of: a second substrate; a second conductor layer on the substrate, the second conductor layer having a thickness in the range 70 to 250 nm and optionally a second dielectric layer on the second conductor layer, the second dielectric layer having a thickness in the range 30 to 160 nm or 120 to 160 nm;

wherein the exposed surfaces of the first and second dielectric layers are disposed less than 180 μm apart to define a microfluidic space adapted to contain microdroplets;

an A/C source to provide a voltage across the first and second composite walls connecting the first and second conductor layers;

- at least one source of electromagnetic radiation having an energy higher than the bandgap of the photoactive layer adapted to impinge on the photoactive layer to induce corresponding virtual electrowetting locations on the surface of the first dielectric layer; and
- means for manipulating the points of impingement of the electromagnetic radiation on the photoactive layer so as to vary the disposition of the virtual electrowetting locations thereby creating at least one electrowetting pathway along which the microdroplets may be caused to move.

In some embodiments, the first and the second dielectric layers may be composed of a single dielectric material or it may be a composite of two or more dielectric materials. The dielectric layers may be made from, but is not limited to, $Al_2O_3$ and $SiO_2$.

In some embodiments, a structure may be provided between the first and second dielectric layers. The structure between the first and second dielectric layers can be made of, but is not limited to, epoxy, polymer, silicon or glass, or mixtures or composites thereof, with straight, angled, curved or micro-structured walls/faces. The structure between the first and second dielectric layers may be connected to the top and bottom composite walls to create a sealed microfluidic device and define the channels and regions within the device. The structure may occupy the gap between the two composite walls.

In some embodiments, the microfluidic chip of the present invention comprises oEWOD structures comprised of:

- a first composite wall comprised of: a first substrate; a first transparent conductor layer on the substrate, the first transparent conductor layer having a thickness in the range 70 to 250 nm; a photoactive layer activated by electromagnetic radiation in the wavelength range 400-850 nm on the conductor layer, the photoactive layer having a thickness in the range 300-1500 nm and a first dielectric layer on the photoactive layer, the first dielectric layer having a thickness in the range 20 to 160 nm;
- a second composite wall comprised of: a second substrate; a second conductor layer on the substrate, the second conductor layer having a thickness in the range 70 to 250 nm and optionally a second dielectric layer on the second conductor layer, the second dielectric layer having a thickness in the range 20 to 160 nm
- wherein the exposed surfaces of the first and second dielectric layers are disposed 20-180 μm apart to define a microfluidic space adapted to contain microdroplets;
- an A/C source to provide a voltage across the first and second composite walls connecting the first and second conductor layers;
- first and second sources of electromagnetic radiation having an energy higher than the bandgap of the photoactive layer adapted to impinge on the photoactive layer to induce corresponding virtual electrowetting locations on the surface of the first dielectric layer; and
- means for manipulating the points of impingement of the electromagnetic radiation on the photoactive layer so as to vary the disposition of the virtual electrowetting locations thereby creating at least one electrowetting pathway along which the microdroplets may be caused to move.

In some embodiments, the microfluidic chip of the present invention comprises oEWOD structures comprising a first and second composite wall. Each of the first and second composite wall comprises a substrate, a conductor layer and a dielectric layer. In addition, the first composite wall has a photoactive layer.

Each of the conductor layers may have a thickness in the range of 70 to 250 nm and may be transparent. The dielectric layers may have a thickness in the range of 20 to 160 nm. The photoactive layer is activated by electromagnetic radiation in the wavelength range 400-850 nm. The photoactive layer has a thickness in the range of 300-1500 nm. Furthermore, the exposed surfaces of the first and second dielectric layers are disposed 20-180 μm apart to define a microfluidic space which contains microdroplets, in use.

The chip also includes an NC source to provide a voltage across the first and second composite walls connected the first and second conductor layers. The chip also includes first and second sources of electromagnetic radiation having an energy higher than the bandgap of the photoactive layer. The electromagnetic radiation sources are adapted to impinge on the photoactive layer to induce corresponding virtual electrowetting locations on the surface of the first dielectric. The chip also includes a digital micromirror device (DMD) which, in use, manipulates the points of impingement of the electromagnetic radiation on the photoactive layer so as to vary the disposition of the virtual electrowetting locations thereby creating at least one electrowetting pathways along which the microdroplets move.

The first and second walls of these structures are transparent with the microfluidic space sandwiched in-between.

Suitably, the first and second substrates are made of a material, which is mechanically strong for example glass metal or an engineering plastic. In some embodiments, the substrates may have a degree of flexibility. In yet another embodiment, the first and second substrates have a thickness in the range 100-1000 μm. In some embodiments, the first substrate is comprised of one of Silicon, fused silica, and glass. In some embodiments, the second substrate is comprised of one of fused silica and glass.

The first and second conductor layers are located on one surface of the first and second substrates and typically have a thickness in the range 70 to 250 nm, preferably 70 to 150 nm. At least one of these layers is made of a transparent conductive material such as Indium Tin Oxide (ITO), a very thin film of conductive metal such as silver or a conducting polymer such as PEDOT or the like. These layers may be formed as a continuous sheet or a series of discrete structures such as wires. Alternatively, the conductor layer may be a mesh of conductive material with the electromagnetic radiation being directed between the interstices of the mesh.

The photoactive layer is suitably comprised of a semiconductor material which can generate localised areas of charge in response to stimulation by the source of the second electromagnetic radiation. Examples include hydrogenated amorphous silicon layers having a thickness in the range 300 to 1500 nm. In some embodiments, the photoactive layer is activated by the use of visible light. The photoactive layer in the case of the first wall and optionally the conducting layer in the case of the second wall are coated with a dielectric layer which is typically in the thickness range from 20 to 160 nm. The dielectric properties of this layer preferably include a high dielectric strength of >10^7 V/m and a dielectric constant of >3. Preferably, it is as thin as possible consistent with avoiding dielectric breakdown. In some embodiments, the dielectric layer is selected from alumina, silica, hafnia or a thin non-conducting polymer film.

In another embodiment of these structures, at least the first dielectric layer, preferably both, are coated with an anti-fouling layer to assist in the establishing the desired microdroplet/carrier fluid/surface contact angle at the various virtual electrowetting electrode locations, and additionally to prevent the contents of the microdroplets adhering to the surface and being diminished as the microdroplet is moved through the chip. If the second wall does not comprise a second dielectric layer, then the second anti-fouling layer may be applied directly onto the second conductor layer.

For optimum performance, the anti-fouling layer should assist in establishing a microdroplet/carrier fluid/surface contact angle that should be in the range 50-180° when measured as an air-liquid-surface three-point interface at 250° C. In some embodiments, these layer(s) have a thickness of less than 10 nm and are typically a monomolecular layer. In another, these layers are comprised of a polymer of an acrylate ester such as methyl methacrylate or a derivative thereof substituted with hydrophilic groups; e.g. alkoxysilyl. Either or both of the anti-fouling layers are hydrophobic to ensure optimum performance. In some embodiments an interstitial layer of silica of thickness less than 20 nm may be interposed between the anti-fouling coating and the dielectric layer in order to provide a chemically compatible bridge.

The first and second dielectric layers, and therefore the first and second walls, define a microfluidic space which is at least 10 μm, and preferably in the range of 20-180 μm, in width and in which the microdroplets are contained. Preferably, before they are contained, the microdroplets themselves have an intrinsic diameter which is more than 10% greater, suitably more than 20% greater, than the width of the microdroplet space. Thus, on entering the chip the microdroplets are caused to undergo compression leading to enhanced electrowetting performance through e.g. a better microdroplet merging capability. In some embodiments the first and second dielectric layers are coated with a hydrophobic coating such a fluorosilane.

In another embodiment, the microfluidic space includes one or more spacers for holding the first and second walls apart by a predetermined amount. Options for spacers include beads or pillars, ridges created from an intermediate resist layer which has been produced by photo-patterning. Alternatively, deposited material such as silicon oxide or silicon nitride may be used to create the spacers. Alternatively layers of film, including flexible plastic films with or without an adhesive coating, can be used to form a spacer layer. Various spacer geometries can be used to form narrow channels, tapered channels or partially enclosed channels which are defined by lines of pillars. By careful design, it is possible to use these spacers to aid in the deformation of the microdroplets, subsequently perform microdroplet splitting and effect operations on the deformed microdroplets. Similarly these spacers can be used to physically separate zones of the chip to prevent cross-contamination between droplet populations, and to promote the flow of droplets in the correct direction when loading the chip under hydraulic pressure.

The first and second walls are biased using a source of A/C power attached to the conductor layers to provide a voltage potential difference therebetween; suitably in the range 10 to 50 volts. These oEWOD structures are typically employed in association with a source of second electromagnetic radiation having a wavelength in the range 400-850 nm, preferably 660 nm, and an energy that exceeds the bandgap of the photoactive layer. Suitably, the photoactive layer will be activated at the virtual electrowetting electrode locations where the incident intensity of the radiation employed is in the range 0.01 to 0.2 $Wcm^{-2}$.

Where the sources of electromagnetic radiation are pixelated they are suitably supplied either directly or indirectly using a reflective screen such as a digital micromirror device (DMD) illuminated by light from LEDs or other lamps. This enables highly complex patterns of virtual electrowetting electrode locations to be rapidly created and destroyed on the first dielectric layer thereby enabling the microdroplets to be precisely steered along essentially any virtual pathway using closely-controlled electrowetting forces. Such electrowetting pathways can be viewed as being constructed from a continuum of virtual electrowetting electrode locations on the first dielectric layer.

The points of impingement of the sources of electromagnetic radiation on the photoactive layer can be any convenient shape including the conventional circular or annular. In some embodiments, the morphologies of these points are determined by the morphologies of the corresponding pixilation and in another correspond wholly or partially to the morphologies of the microdroplets once they have entered the microfluidic space. In one embodiment, the points of impingement and hence the electrowetting electrode locations may be crescent-shaped and orientated in the intended direction of travel of the microdroplet. Suitably the electrowetting electrode locations themselves are smaller than the microdroplet surface adhering to the first wall and give a maximal field intensity gradient across the contact line formed between the droplet and the surface dielectric.

In some embodiments of the oEWOD structure, the second wall also includes a photoactive layer which enables virtual electrowetting electrode locations to also be induced on the second dielectric layer by means of the same or different source of electromagnetic radiation. The addition of a second dielectric layer enables transition of the wetting edge of a microdroplet from the upper to the lower surface of the structure, and the application of more electrowetting force to each microdroplet.

The first and the second dielectric layers may be composed of a single dielectric material or it may be a composite of two or more dielectric materials. The dielectric layers may be made from, but is not limited to, $Al_2O_3$ and $SiO_2$.

A first and second dielectric layer can facilitate the simultaneous manipulation of thousands of microdroplets over a relatively large area, by minimising the adverse effects of pinhole defects. Dielectric layers always have sparse pinhole defects, whereby they become conducting in a small, isolated region. A pinhole defect can trap a droplet and make it impossible to move. The effect is more profound when using droplets of conducting media such as buffer solutions. The first and second dielectric layers of the present invention, can be operated below the dielectric breakdown voltage, and can negate the effect of pinhole defects by minimising the likelihood of any single pinhole defect forming a conductive path. This pinhole-mitigation feature achieved by the presence of the second dielectric layer is key to permitting the simultaneous manipulation of thousands of droplets in a relatively large area. In some embodiments, the device can simultaneously manipulate around 50,000 droplets over an area of greater than 50 $cm^2$.

In some embodiments, optically-mediated electrowetting can be achieved by applying a voltage across the first and second dielectric layers that is below the dielectric breakdown voltage of the dielectric layers. In some embodiments, optically-mediated electrowetting can be achieved using a low power source of illumination, such as LEDs. In some embodiments, optically-mediated electrowetting can be achieved with an illumination source with a power of 0.01 $W/cm^2$. By operating the device below the dielectric breakdown voltage, the adverse effects of dielectric pin-holing can be eliminated, and the low power enables the manipulation and control of conductive droplets in addition to non-conductive microdroplets.

In some embodiments, the device can be used to manipulate and control conductive microdroplets formed from ionic buffer solutions containing biomolecules which can be damaged by high currents. The low voltage applied across the two dielectric layers prevents the destructive ionisation of conductive droplets, and prevents the destruction of the biomolecules.

A structure may be provided between the first and second dielectric layers. The structure between the first and second dielectric layers can be made of, but is not limited to, epoxy, polymer, silicon or glass, or mixtures or composites thereof, with straight, angled, curved or micro-structured walls/faces. The structure between the first and second dielectric layers may be connected to the top and bottom composite walls to create a sealed microfluidic device and define the channels and regions within the device. The structure may occupy the gap between the two composite walls. Alternatively, or additionally, the conductor and dielectrics may be deposited on a shaped substrate which already has walls.

Some aspects of the methods and apparatus of the present invention are suitable to be applied to an optically-activated device other than an electrowetting device, such as a device configured to manipulate microparticles via dielectrophoresis or optical tweezers. In such a device cells or particles are manipulated and inspected using a functionally identical optical instrument to generate virtual optical dielectrophoresis gradients. Microparticles as defined herein may refer to particles such as biological cells, microbeads made of materials including polystyrene and latex, hydrogels, magnetic microbeads or colloids. Dielectrophoresis and optical tweezer mechanisms are well known in the art and could be readily implemented by the skilled person.

In some embodiments, the microdroplets may comprise a biological material, one or more cells or one or more beads. In some embodiments, the microdroplets may comprise a biological cell, cell media, a chemical compound or composition, a drug, an enzyme, a bead with material optionally bound to its surface or a microsphere. More specifically, cells can be mammalian, bacterial, fungi, yeast, macrophage, hybridoma and can be selected from but not limited to: CHO, Jurkat, CAMA, HeLa, B-cell, T-cell, MCF-7, MDAMB-231, *E. coli* or Salmonella. Chemical material contained within microdoplets can be enzymes, assay reagents, antibodies, antigens, drugs, antibiotics, lysis reagents, surfactants, dyes or cell stain. Other biological or chemical materials which may be contained within the microdroplets include DNA oligos, nucleotides, beads/microspheres loaded or unloaded, fluorescent reporters, nanoparticles, nanowires or magnetic particles.

In some embodiments, the constriction may be a physical element such as a physical barrier.

In some embodiments, the constriction means may comprise an opening or a gap. A microdroplet from the first region may enter into the second region and vice versa through the gap. The opening must have sufficient width to allow a microdroplet to pass through the first region into the second region. In some embodiments, the width of the opening may be between 20 to 200 microns. In some embodiments, the width of the opening may be more than 20, 40, 60, 80, 100, 120, 140, 160 or 180 microns. In some embodiments, the width of the opening may be less than 200, 180, 160, 140, 120, 100, 80, 60, 40 or 30 microns. In some embodiments, the width of the opening may be between 20 to 400 microns. In some embodiments, the width of the opening may be more than 20, 50, 100, 150, 200, 250, 300 or 350 microns. In some embodiments, the width of the opening may be less than 400, 350, 300, 250, 200, 150, 100, 50, or 30 microns.

As disclosed in the present invention and unless otherwise stated, the term “constriction means” or “constriction” herein refers to any construction or arrangement that enables the first and second regions to be separated. The constriction means or constriction may be a physical element such as a wall or a barrier to separate the first and second regions. Alternatively or additionally, the constriction means or constriction may be a sheath fluid flow or a semi-permeable membrane.

In some embodiments, the constriction may be a semi-permeable membrane. The semi-permeable membrane may be provided to allow for selective diffusion of molecules or ions. In some embodiments, the semi-permeable membrane may be non-porous.

In some embodiments, the constriction may be a sheath fluid. As disclosed in the present invention and unless otherwise stated, the term “sheath fluid” or “sheath flow” refers to at least two fluids of sufficiently different density or velocity such that the fluids do not mix.

In some embodiments, the geometry of the second region may be a substantially crescent-shaped channel. The crescent-shaped or horseshoe configuration may be advantageous as it allows the inlet port and outlet port of the second region to be manufactured in close proximity within the device. This configuration can maximise useable space within the microfluidic chip. Moreover, the crescent-shaped configuration also has the additional advantage of reducing the burden of fabricating the device and lower manufacturing costs. In some embodiments, the distance between the inlet port and the outlet port of the second region may be 1500 μm. Alternatively, the geometry of the second region may be a semi-circular shaped channel or it may be a square, rectangular or curved geometry. In some embodiments, the second region may have a straight, curved or meandering geometry in order to accommodate other microfluidic features or structures as may be required on the chip. In some embodiments, the geometry of the second region may be any suitable shape or configuration.

The geometry of the second region may have a channel width of between 10 to 1000 microns. The second region may comprise a channel of constant or varying widths. In some embodiments, the width of the channel may be constricted towards the inlet or outlet port to reduce the likelihood of generating low flow regions in which the droplet may become stuck and to also reduce the time taken for the droplet to exit the microfluidic chip.

In some embodiments, the width of the crescent shaped channel may be more than 10, 20, 40, 60, 80, 100, 120, 140, 160, 180, 200, 250, 300, 350, 400, 450, 500, 550, 600, 650, 700, 750, 800, 850, 900 or 950 microns. In some embodiments, the crescent shaped channel may have a width that is less than 1000, 950, 900, 850, 700, 750, 700, 650, 600, 550, 500, 450, 400, 350, 300, 250, 200, 180, 160, 140, 120, 100, 80, 60, 50, 40 30, or 20 microns.

In some embodiments, the second region may further comprise a plurality of channels, each channel may be configured to receive the microdroplet from the first region and transfer said microdroplet to the outlet port of the microfluidic chip.

In some embodiments, the second region may comprise between 1 to 1000 channels. In some embodiments, the second region may comprise more than 1, 10, 50, 100, 150, 200, 250, 300, 350, 400, 450, 500, 550, 600, 650, 700, 750, 800, 850, 900 or 950 channels. In some embodiments, the second region may comprise less than 1000, 950, 900, 850, 750, 700, 650, 600, 550, 450, 400, 350, 300, 250, 200, 150, 100, 50 or 10 channels.

In some embodiments, each of the plurality of channels in the second region may have a substantially crescent-shaped geometry. In some embodiments, each of the plurality of channels in the second region may have a horseshoe configuration. In some embodiments, each of the plurality of channels in the second region may have a semi-circular geometry or each channel may be a square, rectangular or curved in geometry. In some embodiments, each of the plurality of channels in the second region may have a straight, curved or meandering geometry in order to accommodate other microfluidic features or structures as may be required on the chip. In some embodiments, each of the plurality of channels in the second region may be any suitable shape or configuration. The crescent-shaped or horseshoe configuration may be advantageous as it allows the inlet port and outlet port of the second region to be manufactured in close proximity within the device. This configuration can maximise useable space within the microfluidic chip. Moreover, the crescent-shaped configuration also has the additional advantage of reducing the burden of fabricating the device and lower manufacturing costs.

In some embodiments, the plurality of channels in the second region may be arranged in parallel. In some embodiments, the plurality of channels in the second region may be arranged in series.

In some embodiments, a plurality of channels in the second region may be used to facilitate the sorting of microdroplets. In some embodiments, the plurality of channels may combine at a single outlet. In some embodiments, microdroplets of interest and microdroplets found to be irrelevant may be dispensed from the device through the same outlet. In some embodiments, the plurality of channels in the second region may lead to a plurality of outlets in the second region. The plurality of channels and the plurality of outlets may be configured such that a plurality of microdroplets can be dispensed from the microfluidic device simultaneously. Dispensing multiple droplets from the device simultaneously maximizes the throughput of the device by minimising the time taken to dispense a microdroplet from the device.

In some embodiments, microdroplets may be dispensed from the microfluidic device in any desired order. In some embodiments, microdroplets may be dispensed from the device in the same order they were loaded into the microfluidic device with. In some embodiments, microdroplets may be dispensed from the device in a different order to the order they were loaded into the microfluidic device.

In some embodiments, the device may further comprise a means to control flow of the carrier fluid through the microfluidic chip from an inlet to the outlet port of the microfluidic chip.

In some embodiments, the means to control flow of the carrier fluid may be a valve and/or a pump. As an example only, the pump may be a syringe or pressure pump. The valve may be a 2-port 2 way valve or a 3-port selector valve.

In some embodiments, the means to control flow may be a software controlled pump source, such as a syringe pump or pressure pump, which may be connectable to one inlet port of the microfluidic chip. In combination with one or more selector valves, a pump may be connected to multiple ports of the microfluidic chip whereby one or more of the ports can receive flow whilst the other ports are sealed. By having a software controlled pump, the pump source could be automatically controlled and turned on or off without the need for manual intervention.

Additionally or alternatively, the valve and/or pump can be controlled manually. Furthermore, the pump and/or valve used to control the carrier fluid flow provides a constant flow rate throughout the microfluidic chip from the inlet to the outlet port of the microfluidic chip.

In some embodiments, the means to control flow such as a valve and/or pump may be configured to be connected to the outlet port of the microfluidic chip by a conduit. The conduit could be a tube with inner diameter 20-500 microns. In some embodiments, the conduit may have an inner diameter of more than 20, 50, 100, 150, 200, 250, 300, 350, 400 or 350 microns. In some embodiments, the conduit may have a diameter that is less than 500, 450, 400, 350, 300, 250, 200, 150, 50 or 20 microns.

In some embodiments, the valve may be a 2-port 2 way valve, 4-port 2-way valve and/or a 6-port 2-way valve. The valves may additionally have a 'closed' position whereby the outlet port of the microfluidic chip is sealed off such that no fluid can flow. Multiple valves may be connected together in a sequence or a network to achieve a similar outcome.

By having a 4-port 2-way valve, the valve can seal off the microfluidic chip whilst the droplet is being dispensed, reducing likelihood of unwanted droplet movement within the microfluidic chip. The 4-port 2-way valve may also allow use of a higher flow rate to speed up the dispensing once the droplet has passed through the 4-port 2-way valve. In addition, the pressure inside the chip could potentially be more controlled.

By providing a 6-port 2-way valve, there is an additional benefit of drastically reducing or removing air bubbles and/or extra droplets more easily by capturing only the desired droplet in the capture loop. In addition, the use of the 6-port 2-way valve may allow for a sampling loop to be introduced into the conduit, such that only a small volume of the fluid from inside the chip is dispensed. This could allow the carrier phase for the dispense to be an aqueous medium such that only a small volume of the immiscible carrier medium is dispensed along with the droplet, and reduces the amount of immiscible carrier medium required for the dispense process.

By providing a 4-port 2-way valve, a bypass route may be provided such that once the droplet has been removed from the chip and through the valve, the flow can be re-routed directly from the pump to the dispense conduit containing the droplet. Further motion of the droplet would not require fluid to pass through the chip. This reduces the possibility of introducing further unwanted droplets or other materials from the chip into the dispensed volume. In addition, it may also reduce the possibility of disturbance of the contents of the chip. Furthermore, it can also reduce the time at which the contents of the chip are subjected to a higher pressure caused by the high flow rate. The use of the 4-port 2-way valve may allow further oEWOD manipulation inside the second region to be started immediately, reducing the time required for the subsequent dispense operation.

Additionally or alternatively, an 8 port 2-way valve or a 10 port 2-way valve may be provided. The 8 port 2-way valve or a 10 port 2-way valve may allow for the incorporation of a second sampling loop into the conduit such that the dispense process could be accelerated further.

In some embodiments, there is provided a multi-port selector valve. The multi-port selector valves can be used in combination with any other valves as disclosed herein to multiplex the dispense process further.

The device according to the present invention may further comprise a controller configured to control the means of the flow such as a valve and/or pump connected to the outlet port of the second region of the microfluidic chip. The controller may be a software application on a computer or microprocessor.

In some embodiments, the controller may be activated to switch the valve into an open position or switch the pump on such that the carrier fluid from the microdroplet can flow through and out of the outlet port of the microfluidic device. The pump may be controlled to provide a particular flow rate and/or the pump may also be controlled to provide or maintain a constant flow rate. Valve(s) may be controlled to direct the fluid flow into or out of particular inlet ports of the microfluidic device, and/or along a particular connected conduit.

In some embodiments, the device as disclosed in the present invention may further comprise a detection system for detecting a detection signal from the microdroplet dispensed from the outlet port of the microfluidic chip. In some embodiments, the detection system may be utilised to detect the presence or absence of the dispensed microdroplet in a particular location or region of the connected conduit, by way of a sensor or a detection module located wholly or partly inside or in proximity of the connected conduit.

The detection system may comprise a sensor or a detector. In some embodiments, the sensor or detector could be an optical sensor or electrical detector. Examples of an optical sensor can be, but is not limited to, a light source, lens arrangement and photodiode or a phototransistor, or lens and camera. Examples of an electrical sensor or detector can be, but is not limited to, a capacitance detector or an impedance detector.

In some embodiments, the controller may be configured to control the flow of the or each of the microdroplets simultaneously in each of the channels in the second region. Simultaneous flow of microdroplets in a plurality of channels in the second region can minimise the time taken to dispense microdroplets from the device. In some embodiments, the controller may be configured to control the flow of the microdroplets sequentially in each of the channels in the second region. Sequential flow of microdroplets through the plurality of channels in the second region can facilitate sorting the microdroplets before dispensing from the device.

In some embodiments, a plurality of microdroplets can be transferred to the outlet port of the microfluidic chip simultaneously. In some embodiments, a plurality of microdroplets can be dispensed from the microfluidic chip simultaneously.

In some embodiments, the device of the present invention may further comprise an inlet or an outlet port of the first region and a valve provided to an inlet or outlet port of the first region. In some embodiments, the device may further comprise a valve connected at an inlet or outlet port of the first region. It is advantageous to provide a valve at the inlet and/or outlet port of the first region to prevent flow in the first region. Hence, this ensures that the flow in the second region does not interrupt droplet manipulation or storage within the first region.

In some embodiments, the device may further comprise a reader module comprising an analogue circuit, the reader module is configured to read and transmit the generated signal from the sensor or the detection module to the controller, upon which the controller may be further configured to position the valve into an open position such that the microdroplet is dispensed. In some embodiments, the device may further comprise a reader module configured to read and transmit the generated signal from a sensor or a detection module to the controller, upon which the controller is further configured to position the valve into an open position such that the microdroplet is dispensed. The reader module may be a controller such as a microcontroller. The valve may be used to control the direction of the flow at the well-plate and/or at the dispense head. In some embodiments, the flow can be directed to waste container or channel but when the droplet is detected the valve is switched such that the droplet is directed into the well-plate or other dispense receptacle.

In some embodiments, the device of the present invention may further comprise a receptacle, where the receptacle can be configured to receive the dispensed microdroplet. In some embodiments, the device of the present invention may further comprise a receptacle, where the receptacle can be configured to receive a dispensed microdroplet.

In some embodiments, the receptacle is a multi-well plate, a PCR tube or a microcentrifuge tube. The receptacle can be a multi-well plate such as a 96 or a 384 multi-well plate. Alternatively, the receptacle could be a PCR tube or a microcentrifuge tube such as an Eppendorf tube or other suitable container.

In some embodiments, the multi-well plate may be mounted onto a multi-axis motion controlled stage, where the multi-axis motion controlled stage can be configured to move the multi-well plate into a first position such that a target well is positioned under the outlet port of the valve. The multi-axis motion controlled stage may be an X, Y, Z axis motion controlled stage. In some embodiments, the multi-well plate may be mounted onto a multi-axis motion controlled stage, wherein the multi-axis motion controlled stage can be configured to move the multi-well plate into a first position such that a target well is positioned under a valve provided to the outlet port of the microfluidic chip.

Alternatively the valve or dispense head may be mounted onto the motion controlled stage such that the well plate is stationary and the dispense head moves over the well plate. Alternatively both the well plate and the dispense head may be mounted onto motion controlled stages.

In some embodiments, the sensor can be positioned in the conduit i.e. a sample loop such that the 6, 8 or 10 port valve can be switched to an open position to trap the droplet within the conduit i.e. the sample loop. A second sensor can be provided to then detect the droplet in the dispense tubing near the dispense head in order to trigger the droplet to be dispensed into the receptacle. In the embodiments where the sampling loop is used to allow the droplet to be dispensed using an aqueous medium, the sensor would detect the presence of the plug of immiscible carrier fluid that was captured in the sampling loop and which will contain the microdroplet.

In some embodiments, each well may be pre-filled with a volume of cell media. Cell media may include, but is not limited to, EMEM, DMEM, RPMI, K12, Hams.

In some embodiments, each well may be pre-filled with a volume of one or more of the following: buffer, or water, or oil. In some embodiments, the buffer may be lysis buffer. In some embodiments, the buffer or water or oil may include components or prerequisites to be used in subsequent assays. For example, if a PCR or qPCR were to follow, the prerequisites could include primers or appropriate controls.

In some embodiments, during the dispensing procedure as disclosed herein, the end of the conduit such as the end of the outer tubing may be lowered beneath the surface of the pre-filled volume within the well.

The dispense system may include further components or processes to wash the conduit, valve, dispense head and tubing between dispenses to reduce likelihood of cross contamination.

In another aspect of the present invention, there is provided a method for dispensing one or more microdroplets, the method comprising the steps of:

providing a microfluidic chip comprising a first region and a second region separated by a constriction, transporting the microdroplet from the first region into the second region, wherein the microdroplet is dispersed in a carrier fluid at a first flow rate in the first region; wherein the second region is configured to receive the microdroplet via the constriction means from the first region and transfer said microdroplet to an outlet port of the microfluidic chip at a higher carrier fluid flow rate, wherein the second region is configured to receive said microdroplet via the constriction from the first region by application of an optically-mediated electrowetting (oEWOD) force; and wherein the second flow rate in the second region is higher than the first flow rate in the first region.

In some embodiments, there is provided a method for dispensing one or more microdroplets, the method comprising the steps of:

providing a microfluidic chip comprising a first region and a second region separated by a constriction means, transporting the microdroplet from the first region into the second region, wherein the second region is configured to receive the microdroplet via the constriction means from the first region and transfer said microdroplet to an outlet port of the microfluidic chip at a higher carrier fluid flow rate, and characterised in that the second region is configured to receive said microdroplet via the constriction means from the first region by application of an optically-mediated electrowetting (oEWOD) force.

The method of the present invention may further comprise the step of activating a pump and/or valve to control flow of the carrier fluid through the outlet port of the microfluidic chip using a controller. In some embodiments, the method may further comprise the step of activating a means to control flow of the carrier fluid through the outlet port of the microfluidic chip using a controller.

In some embodiments, the means to control flow of the carrier fluid may be connected to the outlet port of the microfluidic chip by a conduit.

In some embodiments, the means to control flow of the carrier fluid may be a pump and/or a valve.

In some embodiments, the activation of the pump may include the step of moving a fixed volume of fluid through the microfluidic chip and the conduit. The conduit can be a tube i.e. outer tubing. The outer tubing can be made from plastic. In some embodiments, the outer tubing is transparent. In some embodiments, the outer tubing is made of fluoropolymer. Preferably, the outer tubing is Fluorinated Ethylene Propylene (FEP) so the operator and sensors can see the droplet moving inside the outer tubing. The tubing may have any length but it can be between 10 to 1000 mm of tubing. For example, the outer tubing can be 200 mm of tubing to be able to stretch to the other side of a well plate (130 mm×85 mm).

The amount of fluid that is provided to move through the microfluidic chip and the conduit is between 1 to 10 μl. In some embodiments, the fixed volume of fluid can be more than 2, 3, 4, 5, 6, 7, 8 or 9 μl. In some embodiments, the fixed volume of fluid may be less than 10, 9, 8, 7, 6, 5, 4, 3 or 2 μl.

Preferably, the fixed amount of fluid is 7 μl. A volume of 7 μL is substantially less than the volume of the target well plate but can be substantially more than the volume of the conduit or fluidic path that must be flushed.

In some embodiments, the method may further include a receptacle. The receptacle can be a multi-well plate or it can be a PCR tube.

The method of the present invention may further comprise the step of mounting a multi-well plate onto a multi-axis motion controlled stage, wherein the multi-axis motion controlled stage may be configured to move the multi-well plate to a target well using the controller such that the target well is positioned under a valve provided to the outlet port of the microfluidic chip. In some embodiments, the method may further comprise the step of mounting a multi-well plate onto a multi-axis motion controlled stage, where the multi-axis motion controlled stage may be configured to move the multi-well plate to a target well using the controller such that the target well is positioned under the outlet port of the valve.

In some embodiments, the method may further comprise the step of switching the valve into an open position such that the microdroplet is dispensed onto the multi-well plate.

In some embodiments, the method may further comprise the step of recording the target well using the controller. By recording the target well using the controller, the operator or user is able to know which well contains the droplets of interest such as droplets containing cells. In some instance, there may be assays in which the target wells may be selected for droplets to be dispensed into them.

In some embodiments, the method may further comprise the step of selecting the target well using the controller such that the droplet of interest can be dispensed in the target well.

In some embodiments, a software function is used to assign a unique identifier to droplets and to record metadata concerning the manipulations carried out on that droplet. This metadata can include a record of the target well in to which that droplet was dispensed. In the case where a droplet is split into two droplets, the metadata can include a record of the target recovery well of one daughter droplet which is dispensed, and the unique identifier of the other daughter droplet which is retained on the chip.

In some embodiments, the method may include performing an optical inspection of the droplets using a brightfield microscope, a fluorescence microscope or a darkfield microscope. The method may include performing an image analysis to classify the droplets and then selecting a target wells for the droplets to be dispensed to on the basis of their classification.

In some embodiments, the method may further comprise the step of generating a signal using a detection module or a sensor provided within the vicinity of the conduit. In some embodiments, the method may further comprise the step of generating a signal using a detection module or a sensor.

In some embodiments, the method may further comprise the step of detecting the generated signal from the detection module or the sensor and transmitting the generated signal to the controller, upon which the controller is further configured to switch the valve into an open position such that the microdroplet is dispensed. In some embodiments, the method may further comprise the step of detecting the generated signal from the detection module or the sensor and transmitting the generated signal to a controller, upon which the controller is further configured to switch a valve into an open position such that the microdroplet is dispensed.

In some embodiments, the method may further comprise the steps of:

de-activating the pump using the controller;

switching the valve into a closed position using the controller;

positioning the outlet port of the valve using the controller above a further target well, different from the first target well;

re-activate the pump using the controller, the pump is configured to move the fixed amount of fluid through the microfluidic chip and the conduit;

switching the valve into the open position using the controller such that the fluid is dispensed into the multi-well plate; and recording the further target well using the controller.

According to a further aspect of the present invention, there is provided an apparatus for dispensing one or more microdroplets, the apparatus comprising:

a microfluidic chip, as described herein, including a second region configured to transfer a microdroplet dispersed in a carrier fluid to an outlet port of the microfluidic chip;

a pump configured to control the flow of the carrier fluid through the microfluidic chip from an inlet to the outlet port of the microfluidic chip;

a conduit connected to the outlet port of the microfluidic chip for receiving the microdroplet once it is dispensed from the chip;

a sensor located in the vicinity of the conduit configured to generate a signal;

a reader module configured to read and transmit the generated signal from the sensor to a controller;

wherein the controller is configured to control a valve and/or pump connected to the outlet port of the microfluidic chip; and wherein depending on the signal generated by the sensor, the controller is configured to switch the valve into a position such that the microdroplet is dispensed from the apparatus, or the controller is configured to switch a valve into a position such that the microdroplet is dispensed onto a receptacle.

The invention will now be further and more particularly described, by way of example only, and with reference to the accompanying drawings, in which.

Figure 2A:
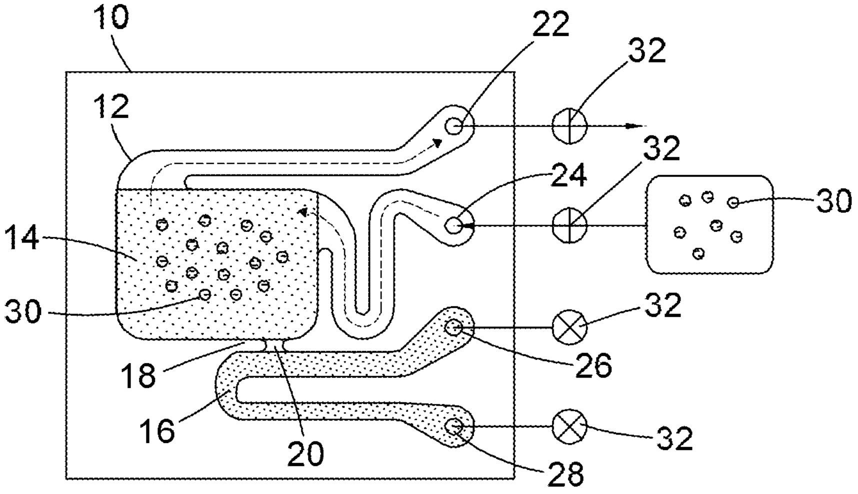
FIGS. 2A, 2B, 2C illustrates the chip loading and dispensing sequence as disclosed in the present invention.
Figure 2B:
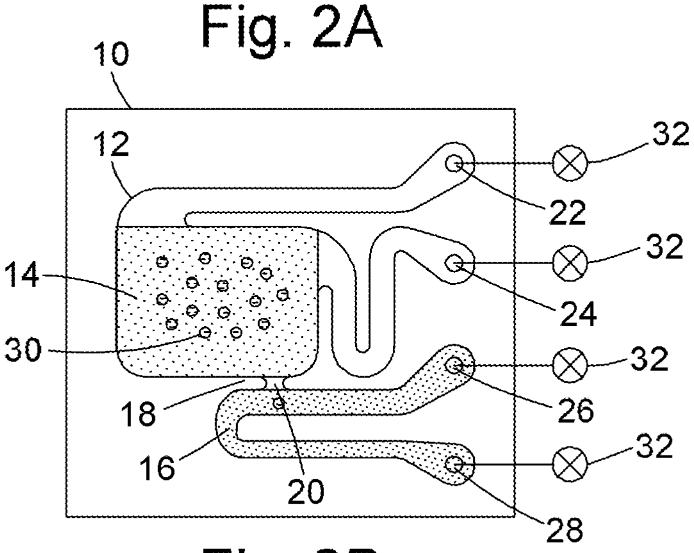
Figure 2C:
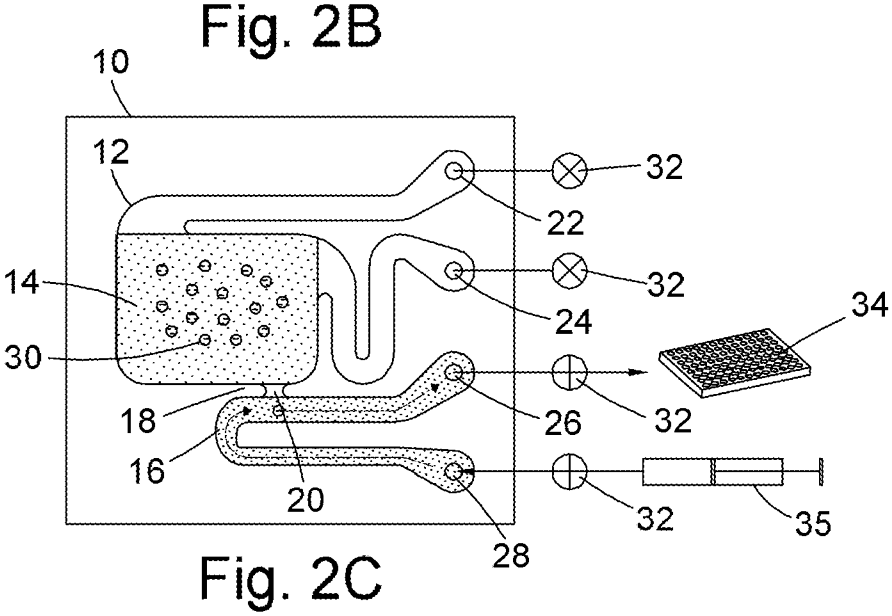
Figure 3A:
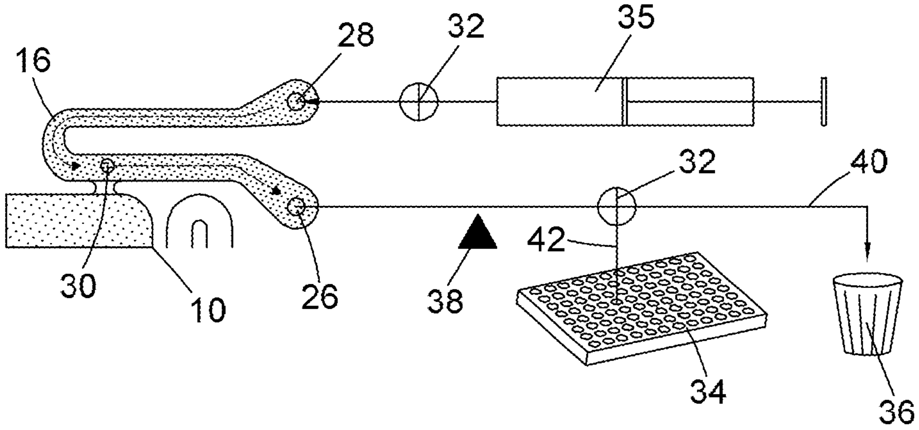
Figure 3B:
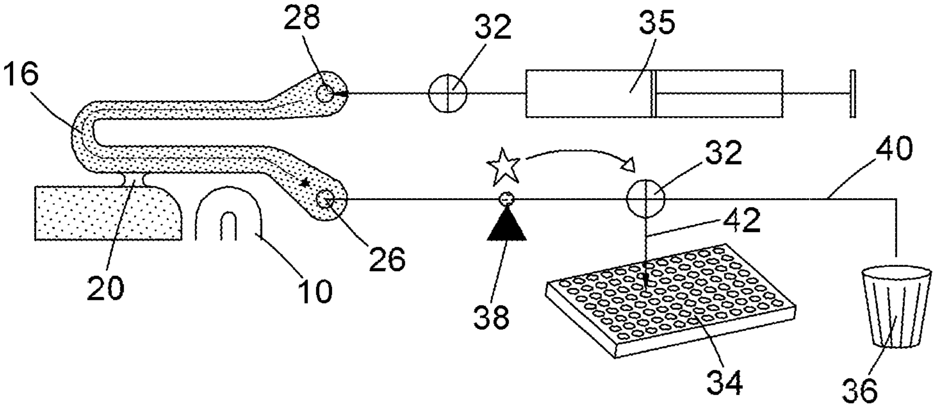
Figure 5A:
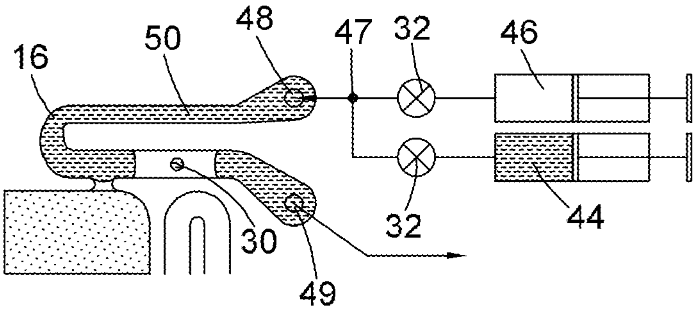
Figure 5B:
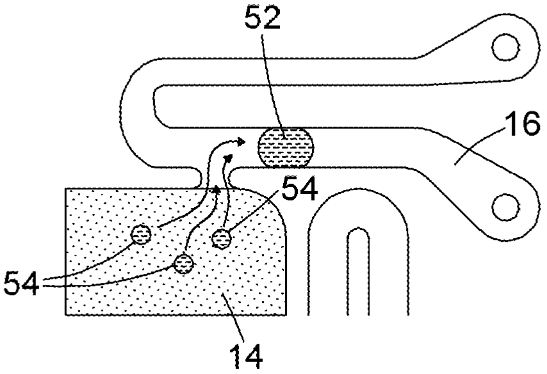

FIGS. 3A and 3B illustrating the dispensing procedure and detection of droplets according to FIGS. 2A to 2C;

FIGS. 4A, 4B, 4C and 4D showing droplet manipulation within the microfluidic device;

FIGS. 5A and 5B showing Droplets dispensed in a multiphase flow; and

Figure 6:
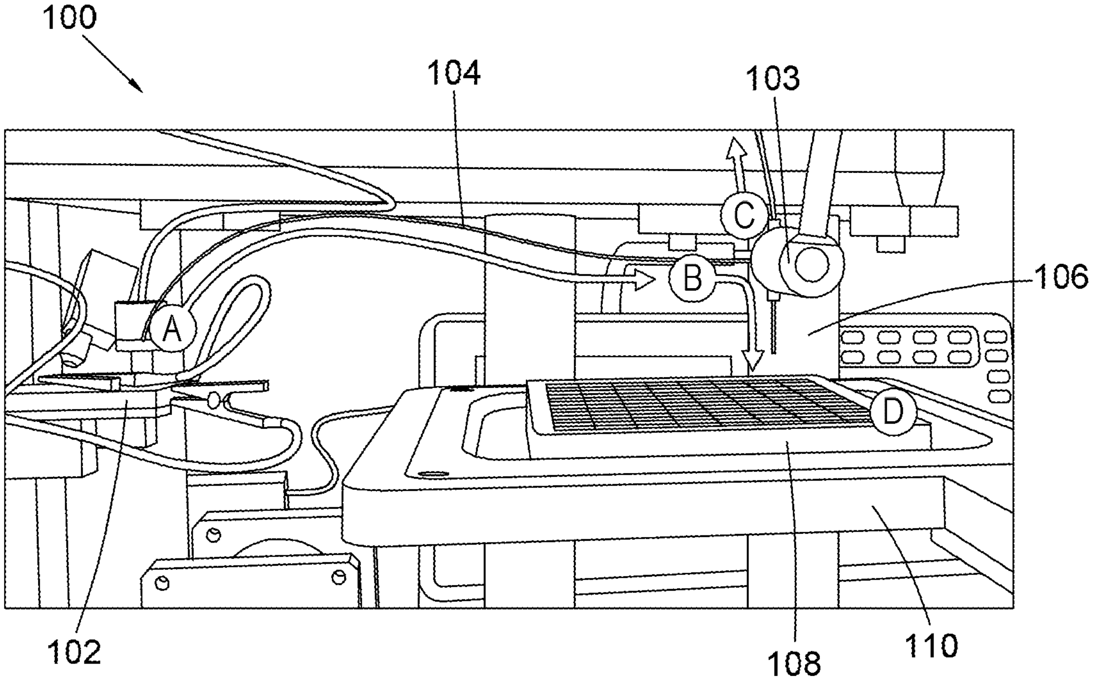

FIG. 6 providing an apparatus or system for dispensing droplets.

Figure 1:
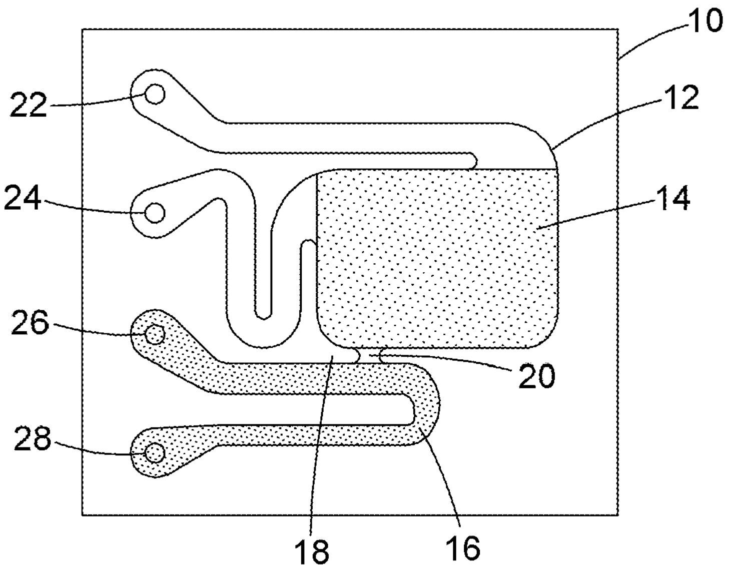
FIG. 1 shows a microfluidic device for dispensing one or more microdroplets as disclosed in the present invention.

Referring to FIG. 1, there is provided a microfluidic device 10 for dispensing one or more microdroplets comprising an enclosed volume 12. The enclosed volume 12 includes a first region 14 and a second region 16. The first region 14 may be a large area as shown in FIG. 1 where droplets are stored, handled and/or manipulated. The first 14 and second regions 16 are separated by a constriction means 18 such as a wall or barrier. The wall or barrier 18 as shown in FIG. 1 would comprise a gap 20 sufficiently wide enough to allow the droplets to go through and enter the second region 16. Droplets containing cells of interest are selected and then moved through the gap 20 via by the application of an optoelectrowetting (oEWOD) force. The device also has a number of ports 22, 24, 26, 28 which can be independently opened or sealed using connected valves.

The first region 14 is adapted to receive and manipulate one or more microdroplets dispersed in a carrier fluid at a low carrier fluid flow rate. In some instances, the low carrier fluid flow rate is zero in the first region 14. This ensures that droplets can be easily manipulated and handled. If the flow rate is too high in the first region 14 then it overcomes the oEWOD force holding droplets in place or manipulating droplets.

The flow rate in the first region can be within the range of 0 to 20 μL/min, or it may exceed 0, 2, 4, 6, 8, 10, 12, 14, 16 or 18 μL/min. In some instances, the flow rate of the first region may be less than 20, 18, 16, 14, 12, 10, 8, 6, 4 or 2 μL/min.

The second region 16 may have two different flow rates. During the standby mode, where the droplets are moved into the second region, the flow rate in the second region can be between 0 to 20 μL/min, or it may exceed 0, 2, 4, 6, 8, 10, 12, 14, 16 or 18 μL/min. In some instances, the flow rate of the second region in standby mode may be less than 20, 18, 16, 14, 12, 10, 8, 6, 4 or 2 μL/min.

During the dispensing mode, where droplets are being dispensed out of the chip, the flow rate of the second region is 10-100 μL/min, or it may exceed 10, 20, 30, 40, 50, 60, 70, 80 or 90 μL/min. In some instances, the flow rate of the second region during dispense is less than 100, 90, 80, 70, 60, 50, 40, 30, 20 or 15 μL/min.

A droplet may contain biological material, cells or beads. A droplet may contain a single or multiple cells. A droplet may contain a single or multiple beads. A droplet can be of any shape or size but preferably, the droplet is of spherical or cylindrical shape. The size of a droplet may be between 20 to 600 μm but it may be more than 20, 30, 40, 50, 60, 80, 100, 120, 140, 150, 160, 180, 200, 220, 240, 250, 260, 280, 300, 320, 340, 360, 380, 400, 420, 440, 460, 480, 500, 520, 540, 550, 560 or 580 82 m. In some embodiments, the size of the droplet may be less than 600, 580, 560, 550, 540, 520, 500, 480, 460, 440, 420, 400, 380, 360, 340, 320, 300, 280, 260, 250, 240, 220, 200, 180, 160, 150, 140, 120, 100, 80, 60, 50, 40 or 30 μm. A plurality of droplets can be merged together to form a larger droplet. Alternatively, a large droplet can be divided to form smaller sized droplets as appropriate.

If the droplet is too small relative to the height of the microfluidic chamber then the droplet is not in contact with both sides of the walls within the microfluidic chamber and hence, the droplet cannot be moved by oEWOD. In contrast, large droplets with respect to the device geometry can be hard and/or slow to move within the microfluidic chamber and often disrupt other operations simply by getting in the way by obstructing other correctly-sized droplets or by merging with correctly-size droplets.

Referring to FIG. 1, the second region 16 is a channel such as a microchannel connected between an inlet port and an outlet port contained within the second region 16. The microchannel 16 is configured to receive the microdroplet via through the gap 20 within the constriction means 18 from the first region 14 and transfer said microdroplet to an outlet port of the second region 16 of the microfluidic chip 10 at a higher carrier fluid flow rate. The higher carrier fluid flow rate may be generated by attaching a pump source at one of the ports located within the second region 16. The pump source may be a syringe pump or pressure pump, connected to one or more inlet or outlet ports of the microfluidic chip 10. In addition, the valve can be a software controlled valve connected to one or more outlet or inlet ports of the microfluidic chip 10.

The microchannel can be patterned inside the second region 16 of the microfluidic chip 10 in such a way that the microchannel is connected between an inlet port and an outlet port within the second region 16.

A pump source is connected to one or more outlet ports such as port 22 and port 28 through a 2-way valve, as shown in FIG. 1. Droplets are loaded through another port, for example port 24 by aspirating from port 22. Droplets are manipulated in the first region 14 and then selected to move into the second region 16 via the application of the oEWOD force. FIG. 1 also illustrates that the droplets are then dispensed from the outlet port e.g. outlet port 26 by pumping into port 28, whilst ports 22 and 24 are shut off via a valve. The pump source is then switched off and the valve at the outlet ports of the microfluidic chip 10 is in a closed position.

Referring to FIGS. 2A, 2B and 2C, there is shown microdroplets 30 loading onto the microfluidic chip 10 and the dispensing sequence. The microfluidic chip 10 comprises an enclosed volume 12. The enclosed volume 12 includes a first region 14 and a second region 16. As shown in FIG. 2A, the valves 32 are connected to the ports 22, 24, 26, 28 of the microfluidic chip 10 such that each port 22, 24, 26, 28 can be opened or closed. Droplets 30 are loaded into the first region 14 of the chip 10 by passing a stream of carrier fluid containing droplets between two of the ports, whilst the other ports are sealed by the valves 32. The valves 32 are closed to reduce the flow rate inside the first region 14 to zero. Droplets 30 are then stored and/or manipulated in the first region 14.

Referring to FIG. 2B, there is shown a droplet 30 being selected and moved from the first region 14 through the gap 20 located within the constriction means 18 into the second region 16 by application of the oEWOD force.

As shown in FIG. 2C, the droplet 30 is then dispensed from the outlet port e.g. outlet port 26 by pumping into port 28 using a syringe pump 35, whilst ports 22 and 24 are shut off via by a valve 32. The droplets 30 can be dispensed into a receptacle such as a multi-well plate 34 as illustrated in FIG. 2C. The voltage may be switched off during the dispense cycle to allow the droplet to be released from the oEWOD force.

Referring to FIG. 3A, there is provided a microfluidic chip 10 showing the second region 16. The ports 26, 28 of the microfluidic chip are connected a valve 32. Both valves are in an open position as illustrated in FIG. 3A. A carrier fluid is infused from the pump 35, causing the droplet 30 to move through the second region 16 and out of the chip 10 into the conduit 40. The outlet valve 32 is open to a waste channel 36 or container. A sensor 38 is located in the vicinity of the conduit 40 to monitor for the presence of the droplet within the conduit 40.

The detection module 38 can be an optical sensor such as a photodiode or phototransistor, or an electrical sensor such as a capacitance or impedance sensor, or a combination of several such sensors. The set of sensors can be positioned around the vicinity of the conduit. The sensors would then generate an electrical signal when a droplet passes a detection window. Optionally, inspection cameras can be positioned to image the inside of the tubing either side of the valve such that videos or images from the inspection cameras can be recorded and analysed by a reader module.

The apparatus further comprises a reader module such as a microcontroller (not shown in the accompanying figures) which is configured to read and transmit the generated signal from the sensor or the detection module to the controller. The reader module such as a microcontroller is configured to read the output signals of the sensors and transmit the status of the sensors to the controller.

Referring to FIG. 3B, there is illustrated the detection of a droplet using sensors or optical detectors 38, the software controller will position the valve 32 to be open to a second conduit 42 directed into the receptacle 34 so that the droplet is transferred into the receptacle 34.

Figure 4A:
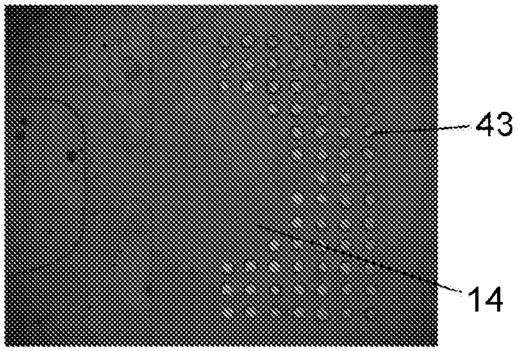

Referring to FIG. 4A, there is shown target droplets 43 being manipulated and assayed inside the optofluidic chamber within the first region 14. The droplets 43 can be moved and re-arranged into an array.

Figure 4B:
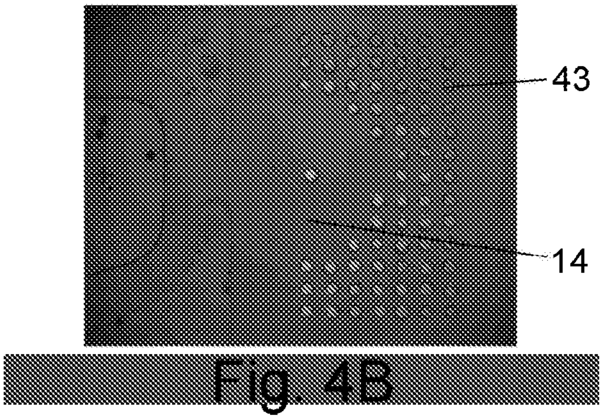
Figure 4C:
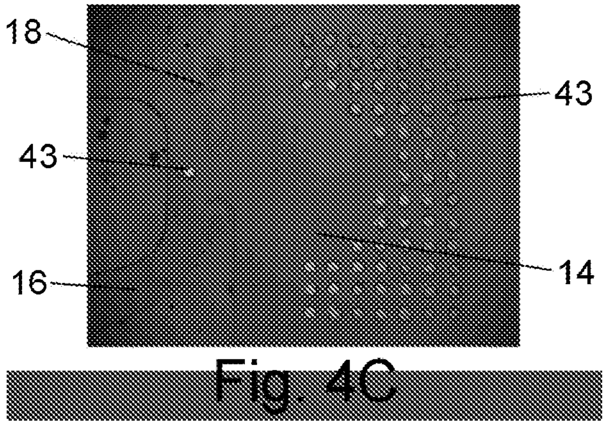

Referring to FIGS. 4B and 4C, there is shown a selected droplet 43 being moved by oEWOD force through the constriction means 18 into the second region 16.

Figure 4D:
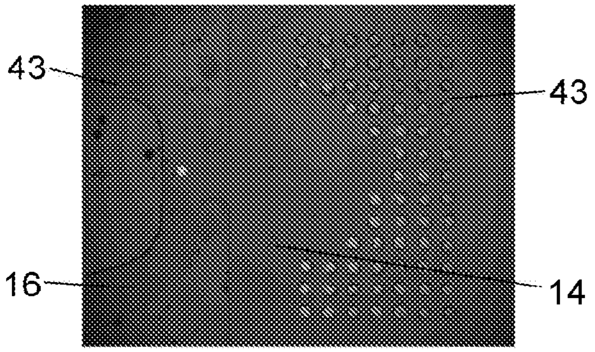

As illustrated in FIG. 4D, the droplet 43 is dispensed by opening the valves connected to the ports of the second region 16 and infusing carrier fluid to create a high flow rate within the second region 16 to transport the droplet out of the device.

Referring to FIG. 5A, droplets can be dispensed in a multi-phase flow. Two independent pumps, one with aqueous medium 44 and one with immiscible carrier fluid 46 are connected to the inlet port 48, possibly by a junction component 47. Valves 32 are also provided as shown in FIG. 5A. The valves 32 can open or close independently of each other. In some cases, the valves may open or close in sequence or in tandem or they may open or close simultaneously. A plug of medium 50 is infused into the second region 16 of the chip 10 before and/or after a volume of immiscible carrier fluid. The droplet 30 is moved into the immiscible carrier fluid section and then the mixed phase fluids are infused through the outlet 49 to the dispense receptacle. This reduces the volume of immiscible fluid introduced into the dispense receptacle.

As shown in FIG. 5B, a larger sized droplet 52 can be created by selecting smaller droplets 54 and merging them together to form a larger droplet 52. The merged droplet 52 may have a diameter size of approximately 50 μm in diameter. In some instances, the smaller droplets 54 can be merged together to form a larger droplet 52 upon a voltage application to the device of between 5 to 10 V, preferably at 10 V. The merged droplet 52 can be pushed out of the outlet port of the microfluidic chip by using a pump. The flow rate within the second region may be between 10 to 100 μL/min.

In some instances, where droplets are merged into a stream of aqueous (or a plug) soon after leaving the chip, the amount of oil that ultimately has to be ejected from the chip and ultimately in to the well is minimised. Thus, this would avoid filling the receptacle such as a well with oil. Additionally or alternatively, the small droplet 54 can precede the big aqueous plug 52 or merged droplet and can be pumped out of the microfluidic chip via a syringe pump, hence it avoids filling the receptacle such as a well with oil.

Referring to FIG. 6, there is provided a dispensing apparatus or system 100. The dispensing apparatus or system 100 comprises a device as disclosed in the previous aspects of the invention. The apparatus 100 for dispensing one or more microdroplets comprises a microfluidic chip 102, the microfluidic chip 102 (A) includes a first region and a second region, wherein the first and second regions are separated by a constriction means; where the first region is adapted to receive and manipulate one or more microdroplets dispersed in a carrier fluid at a low carrier fluid flow rate; and where the second region is configured to receive the microdroplet via the constriction means from the first region and transfer said microdroplet to an outlet port of the microfluidic chip at a higher carrier fluid flow rate, whereby the second region is configured to receive said microdroplet via the constriction means from the first region by application of an optically-mediated electrowetting (oEWOD) force.

The apparatus further comprises a controller configured to control the valve and/or pump connected to the outlet port of the microfluidic chip 102. A valve 103 (B) is connected to an outlet port of the microfluidic device 102 as shown in FIG. 6 and a pump (not shown in the accompanying drawings) is connected to an inlet port of the microfluidic device 102. The outlet port of the microfluidic chip 102 is connected with a conduit 104 such as a tube. The conduit can be transparent.

The receptacle 108 is a multi-well plate 108. The multi-well plate is mounted on a multi-axis controlled stage 110 with an XYZ configuration. The multi-well plate 108 may be a 96 or a 384-well plate. The stage 110 can be manually or automatically controlled. The receptacle 108 can also be a waste container or reservoir or a PCR tube or a microcentrifuge tube such as an Eppendorf tube. Optionally, each well pre-filled with a volume of cell media. The controller is configured to control the movement of the stage where the multi-well plate is mounted onto during the dispensing procedure. One droplet may be dispensed in each well and/or multiple droplets can be dispensed into one well.

During the dispensing procedure, the dispense head 106 moves down into a well containing an aqueous buffer. Additionally or alternatively, the well may move towards the dispense head 106. Alternatively, the dispense head 106 may be fixed in position and the well plate may move towards the dispense head 106. The pump connected to an inlet port of the microfluidic chip 102 is activated and pumps for a length of time and at an appropriate speed to pump the required volume of buffer through the microfluidic chip. The precise time and speed depends on the size of the microchannel, interconnecting tubing and interface connections. For example, the pump connected to an inlet port of the microfluidic chip 102 can be activated and pumps for 12 seconds at 50 μL/min. The valve connected to an outlet port of the microfluidic chip 102 is opened such that a certain amount of volume typically about 7 μL to 10 μL to is pushed out of the microfluidic chip into the tubing 104 and dispensed into a waste container. The fixed volume of 7 μL to 10 μL may be adequate to fully purge the microchannel and the interconnecting tubing and interface connections.

Droplet(s) can then be moved from the microfluidic chip 102 and into the tubing 104 stopping just before the valve. The pump is then deactivated and stops pumping fluids out of the microfluidic device 102 whilst the valve moves into a dispensing position. The pump is reactivated by the controller for a further 4 seconds and the droplet is dispensed into the well 108. The valves are then manually closed or the valve can be automatically closed by the software controlled controller.

In some examples, the method of dispensing or the sequence of dispensing a droplet can be as follows: the pump source is switched off and the valve is in a closed position as controlled by the controller. The target droplets are manipulated and assayed inside the optofluidic chamber within the microfluidic chip. Optoelectrowetting transport moves a target droplet from the optofluidic chamber into the microchannel within the microfluidic chip. The 3-axis stage moves the multi-well plate such that a target well is positioned under the outlet tubing of the software-controlled valve. The software-controlled pump is activated and starts displacing a fixed volume of a fluid, typically 7 microlitres to adequately purge the microchannel and the interconnecting tubing and interface connections.

The software-controlled valve is then switched to an open position, such that the fluid is routed into the multi-well plate. The resulting flow of fluids in the microchannel purges the droplet, along with a volume of carrier phase, into the multi-well plate. Optionally, the sensors or cameras are interrogated and the presence of a droplet in the outlet tubing before the multi-well plate is determined. If no droplet is detected the pump source is commanded to dispense extra volume to recover the droplet. The pump is switched off and the valve is closed. The dispense head is withdrawn from the multi-well plate and/or the multi-well plate is withdrawn from the dispense head. Optionally the multi-well plate is moved to place a waste well or alternative waste receptacle below the dispense head and the microfluidic pathway are purged. The steps as described above are repeated until all the target droplets have been recovered from the microfluidic device. The multi-well plate is recovered for further experiments such as DNA sequencing or cell expansion.

Alternatively, the droplets may be recovered by relying on the pump and valve to meter the correct volume to recover a droplet. By way of example only, 2 to 5 μL metering volume can be provided for 20 cm tube length and a 0.1 mm inner diameter, 0.1 μm dispensing at 20 μl/min. This means that there is not a requirement to provide sensors or camera to detect the droplets within the tubing. Additionally or alternatively, the apparatus as disclosed in the present invention may support multiple dispense pathways and multiple pump sources and valves as appropriate in order to parallelise the recovery process of one or more droplets of interest.

The device, apparatus and methods of the present invention can be used for many applications such as dispensing of single cells. In some instances, the droplet may contain a plurality of cells. Droplets may contain random number of cells, including single cells. Furthermore, the recovered droplet containing single cells or multiple cells can be assayed which may include, but is not limited to PCR amplifications, DNA sequencing, RNA sequencing and cell expansion. Efficiency of dispensing may be assessed by dyeing droplets with trypan blue and using cameras to film the droplet before and after dispense valve. By way of example only, a dispense is considered successful if a droplet is detected after the dispense valve in <12 seconds from dispense start. In one example only, efficiency of dispensing single cells and doing PCR is around 80% ($^{40}/_{50}$), while overall efficiency of PCR after dispense is 79% ($^{66}/_{84}$).

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

The invention claimed is:

1. A device for dispensing one or more microdroplets, the device comprising a microfluidic chip having an optically-mediated electrowetting (oEWOD) structure configured to create an oEWOD force, the microfluidic chip includes a first region and a second region, wherein said first and second regions are separated by a constriction; wherein the first region is adapted to receive and manipulate one or more microdroplets dispersed in a carrier fluid at a first flow rate; and wherein the second region is configured to receive the microdroplet via the constriction from the first region and transfer said microdroplet to an outlet port of the microfluidic chip in a second flow rate; wherein the second region is configured to receive said microdroplet via the constriction from the first region by application of an optically-mediated electrowetting (oEWOD) force; and wherein the device further comprises a valve and/or a pump, the valve and/or the pump is configured to enable the microdroplet to be dispensed through and out of the outlet port of the chip; and a controller configured to control the valve and/or the pump such that the second flow rate in the second region is higher than the first flow rate in the first region.

2. The device according to claim 1, wherein the constriction is a physical barrier.

3. The device according to claim 1, wherein the constriction is a semi-permeable membrane.

4. The device according to claim 1, wherein the microdroplets comprise a biological material, one or more cells or one or more beads.

5. The device according to claim 1, wherein the constriction comprises an opening, wherein the width of the opening is between 20 to 400 microns.

6. The device according to claim 1, wherein the geometry of the second region is a substantially crescent-shaped channel.

7. The device according to claim 1, wherein the second region further comprises a plurality of channels, each channel is configured to receive the microdroplet from the first region and transfer said microdroplet to the outlet port of the microfluidic chip.

8. The device according to claim 7, wherein the controller is configured to control the flow of the or each of the microdroplets simultaneously in each of the channels in the second region.

9. The device according to claim 1, further comprising a detection system for detecting a detection signal from the microdroplet dispensed from the outlet port of the microfluidic chip.

10. The device according to claim 1, further comprising a reader module configured to read and transmit the generated signal from a sensor or a detection module to the controller, upon which the controller is further configured to position the valve into an open position such that the microdroplet is dispensed.

11. The device according to claim 1, further comprising a receptacle, wherein the receptacle is configured to receive a dispensed microdroplet.

12. The device according to claim 11, wherein the receptacle is a multi-well plate, a PCR tube or a microcentrifuge tube.

13. The device according to claim 12, wherein the multi-well plate is mounted onto a multi-axis motion controlled stage, wherein the multi-axis motion controlled stage is configured to move the multi-well plate into a first position such that a target well is positioned under a valve provided to the outlet port of the microfluidic chip.

14. The device according to claim 9, wherein the detection system includes an optical detector.

15. An apparatus for dispensing one or more microdroplets, the apparatus comprising:

a microfluidic device according to claim 1;

a conduit connected to the outlet port of the microfluidic chip for receiving the microdroplet once it is dispensed from the chip;

a sensor located in the vicinity of the conduit configured to generate a signal;

a reader module configured to read and transmit the generated signal from the sensor to a controller;

wherein the controller is configured to control a valve and/or pump; and wherein in response to the signal generated by the sensor, the controller is configured to switch the valve into a position such that the microdroplet is dispensed from the apparatus, or the controller is configured to switch the valve into a position such that the microdroplet is dispensed onto a receptacle.

16. A method for dispensing one or more microdroplets out of a microfluidic chip, the method comprising the steps of:

providing a device comprising the microfluidic chip having a first region and a second region separated by a constriction, the device further comprises a pump and/or a valve;

transporting the microdroplet from the first region into the second region, wherein the microdroplet is dispersed in a carrier fluid at a first flow rate in the first region; wherein the second region is configured to receive the microdroplet via the constriction means from the first region and transfer said microdroplet to an outlet port of the microfluidic chip at a higher carrier fluid flow rate, wherein the second region is configured to receive said microdroplet via the constriction from the first region by application of an optically-mediated electrowetting (oEWOD) force; and activating the pump and/or the valve using a controller to control the flow of the carrier fluid such that the microdroplet is dispensed through and out of the outlet port, wherein the activation of the pump and/or valve using the controller causes the second flow rate in the second region to be higher than the first flow rate in the first region.

17. The method according to claim 16, further comprising the step of mounting a multi-well plate onto a multi-axis motion controlled stage, wherein the multi-axis motion controlled stage is configured to move the multi-well plate to a target well using the controller such that the target well is positioned under a valve provided to the outlet port of the microfluidic chip.

18. The method according to claim 17, further comprising the step of recording the target well using the controller.

19. The method according to claim 16, further comprising the step of generating a signal using a detection module or a sensor.

20. The method according to claim 19, further comprising the step of detecting the generated signal from the detection module or the sensor and transmitting the generated signal to the controller, upon which the controller is further configured to switch a valve into an open position such that the microdroplet is dispensed.

* * * * *